(12) United States Patent
Wong

(10) Patent No.: US 9,310,051 B2
(45) Date of Patent: Apr. 12, 2016

(54) SINGLE PIXEL MONOCHROMATIC DISPLAY AND SIGNAL-RECEIVABLE MODULE, AND A DEVICE CONTAINING THE MODULE

(71) Applicant: Yuen Chiu Wong, Hong Kong (CN)

(72) Inventor: Yuen Chiu Wong, Hong Kong (CN)

( * ) Notice: Subject to any disclaimer, the term of this patent is extended or adjusted under 35 U.S.C. 154(b) by 92 days.

(21) Appl. No.: 14/353,492

(22) PCT Filed: Mar. 28, 2013

(86) PCT No.: PCT/CN2013/073297
§ 371 (c)(1),
(2) Date: Apr. 23, 2014

(87) PCT Pub. No.: WO2014/134847
PCT Pub. Date: Sep. 12, 2014

(65) Prior Publication Data
US 2015/0022565 A1   Jan. 22, 2015

(30) Foreign Application Priority Data

Mar. 4, 2013  (CN) .......................... 2013 1 0067384
Mar. 4, 2013  (CN) ...................... 2013 2 0096794 U

(51) Int. Cl.
*G06F 1/00*      (2006.01)
*F21V 13/02*    (2006.01)
*G06F 9/30*      (2006.01)
*G09G 5/10*      (2006.01)

(52) U.S. Cl.
CPC . *F21V 13/02* (2013.01); *G06F 9/30* (2013.01); *G09G 5/10* (2013.01)

(58) Field of Classification Search
CPC ................. G06F 3/0412; G06F 3/044; G06F 2300/0819; G06F 3/36
See application file for complete search history.

(56) References Cited

U.S. PATENT DOCUMENTS

2006/0114374 A1 * 6/2006 Segawa ............ G02F 1/133526
349/95

* cited by examiner

*Primary Examiner* — Michael Faragalla

(57) ABSTRACT

A single pixel monochromatic display and signal-receivable module, and a device containing the module; the module is mainly a combination of a set of lenses and a color mixing screen; light beams projected from color light sources are converged through a light convergent plate, and then refracted through the light refractive color convergent plate which has refraction curved surfaces to same locations on a color mixing screen on which a single color is formed and a single pixel is thereby constituted; even subject to enlargement, there are no more tri-colors in a single pixel but only one single color in a single pixel; the module can also be used to emit or receive invisible electromagnetic waves, or can receive electromagnetic wave signals of another wave length during display.

10 Claims, 6 Drawing Sheets

SINGLE PIXEL MONOCHROMATIC DISPLAY AND SIGNAL-RECEIVABLE MODULE, AND A DEVICE CONTAINING THE MODULE

BACKGROUND OF THE INVENTION

The present invention relates to a display device, and more specifically relates to a single pixel monochromatic display and signal-receivable module, and a device containing the module.

In a color display commonly available nowadays, each actual color of a single pixel is simulated by the three primary colors: Red (R), Green (G) and Blue (B), or simulated by other different colors such as secondary colors and tertiary colors.

When our eyes see an actual color which is a combination of the three primary colors (i.e. combination of two or more of the three primary colors), coordination by the brain is required so that the brain can perceive the actual color we see. In other words, forced blurring treatment of the primary colors is carried out by the brain in order to perceive the actual color we see. Therefore, after watching a color display especially a large color display over a long period of time, interference by colors with the brain and the eyes will lead to fatigue of the brain and the eyes and is also harmful to the eyes. The brain and the eyes are affected and may even deteriorate. Especially nowadays, many kids have already started using mobile phones and tablets equipped with such color display. Harmful effects to the eyes and minds of the kids will become more apparent in the future. The future society may therefore be seriously and negatively affected. However, there is currently no substitute for this kind of color display.

Moreover, large color display operating by means of primary color dots cannot produce a clear image for viewing and it makes the viewer feels dizzy. Even when the image is viewed at a distance, the primary colors themselves are still clearly visible and the viewer can barely see the image.

BRIEF SUMMARY OF THE INVENTION

The present invention substitutes a single pixel monochromatic display for the single pixel polychromatic display available nowadays. The present invention provides a single pixel monochromatic display and signal-receivable module, and a device containing the module. The present invention breaks the existing concept of displaying an image and reduces physical problems relating to the eyes and brains due to blurring treatment of colors during color perception.

The present invention adopts the following technical proposal:

A single pixel monochromatic display and signal-receivable module, characterized in that, it comprises:

Color light sources, wherein the color light sources are multiple in number and are arranged adjacent to one another; different color light sources generate light beams of different colors;

A light convergent plate; the light convergent plate is a set of concave lenses each corresponding to a respective color light source of the color light sources; each of the concave lenses gathers a bundle of diffused light beams generated by a respective color light source so that the bundle of diffused light beams generated by the respective color light source are gathered and projected to a light refractive color convergent plate; the light convergent plate is used for converging each bundle of diffused light beams generated by each of the color light sources;

the light refractive color convergent plate has refraction curved surfaces; each refraction curved surface refracts a respective bundle of diffused light beams converged by the light convergent plate to another side (a light casting surface) of the light refractive color convergent plate; different bundles of diffused light beams converged by the light convergent plate and then refracted by different refraction curved surfaces in the single pixel monochromatic display and signal-receivable module are however refracted to the same locations at the light casting surface;

A color mixing screen; the color mixing screen is a screen that projects the light beams of different colors generated by different color light sources as a monochromatic color;

A light blocking wall; the light blocking wall is provided so that the color mixing screen experiences reduced influence of lights from surrounding environment, thereby allowing a clear pixel to be formed and allowing better dark-light contrast and increasing degree of contrast;

The light beams of different colors generated by different color light sources are projected to the light refractive color convergent plate after convergence, and then enter the light refraction surfaces of the light refractive color convergent plate, and then refracted to the light casting surface at another side of the light refractive color convergent plate; on the color mixing screen which is tightly attached to the light casting surface, the light beams of different colors are mixed into a monochromatic color;

The color light sources can be color light sources of three primary colors commonly used, namely, red color light source, green color light source and blue color light source;

Further, the single pixel monochromatic display and signal-receivable module also comprises a light convergent plate; the light convergent plate is a set of concave lenses each corresponding to a respective color light source of the color light sources; each of the concave lenses gathers a bundle of diffused light beams generated by a respective color light source so that the bundle of diffused light beams generated by the respective color light source are gathered and projected to a light refractive color convergent plate; the light convergent plate is used for converging each bundle of diffused light beams generated by each of the color light sources;

Further, more than one of the single pixel monochromatic display and signal-receivable module can be combined and used in form of linear arrangement, a surface plane or other kinds of arrangement;

Further, the light refractive color convergent plate is made of transparent or semi-transparent material;

Further, the color mixing screen can be provided independently and separately, or can be formed by processing the light casting surface of the light refractive color convergent plate;

Further, the color mixing screen is treated as a frosted surface, a matte surface, a frosted coating layer, a matte coating layer or a fluorescent material coating layer;

Further, the light blocking wall is a frame or a coating layer made of dark or black light absorption material.

A display device containing single pixel monochromatic display and signal-receivable module, characterized in that, the display device comprises multiple single pixel monochromatic display and signal-receivable modules, and further comprises an anti-inference separation layer for separating the single pixel monochromatic display and signal-receivable modules to prevent their mutual interference.

Further, the anti-interference separation layer can be a light blocking barrier additionally mounted according to whatever manner or a barrier treated to possess light blocking property at the light refractive color convergent plate and/or the light refractive plate of each single pixel monochromatic display and signal-receivable module;

Preferably, an electronic grayscale control device is provided for controlling so as to increase contrast during display; the electronic grayscale control device coordinates with the light blocking wall or is used in lieu of the light blocking wall; the electronic grayscale control device controls grayscale of the display device containing single pixel monochromatic display and signal-receivable module according to light magnitude of pixel dots displayed; when lights of the pixel dots turn to be the brightest, the relevant pixel dots are controlled to possess a weaker grayscale and turn transparent; when lights of the pixel dots turn to be black, the relevant pixel dots are controlled to possess stronger grayscale and turn black.

The present invention is mainly a combination of a set of lenses and a light casting surface. Light beams projected from the color light sources experience convergence through the light convergent plate, and then the light beams mutually adjacent to one another after convergence are refracted through the light refractive color convergent plate which has refraction curved surfaces, and then projected to the color mixing screen on which a single color is formed and a single pixel is thereby constituted. Even subject to enlargement, there are no more tri-colors in a single pixel but only one single color in a single pixel. Under this fine technology, the display device is able to show image which is closer to the reality. Combination of original colors is no longer visible.

Reference signs in the figures: S1-red color light source; S2-green color light source; S3-blue color light source; 111-light convergent plate; 112-light refractive color convergent plate; 113-color mixing screen; 114-light blocking wall; 115-anti-interference separation layer.

DETAILED DESCRIPTION OF THE INVENTION

The present invention will be described and provided with many specific details so that the embodiments of the present invention can be fully understood. However, a person skilled in this field of art should understand that the embodiments of the present invention can be carried out in the absence of one or more of the specific details mentioned herein, or can be carried out together with other devices, systems, components, methods, materials, parts or the like. Furthermore, known structures, materials and operation are not shown and described in detail in some other illustrative examples in order to avoid unclear understanding of or confusion with the embodiments of the present invention.

A preferred embodiment of the present invention is now described in detail below with reference to the accompanying drawings.

In a preferred embodiment, color sources are three primary color light sources adjacent to one another. The single pixel monochromatic display and signal-receivable module of the present invention is adaptable to color light sources of any different dimensions. In actual practice, a small display usually requires high reproduction quality, in this case, distance between a light source and another adjacent light source is usually not longer than length of the light source. In case of large display and owing to its high price, the distance between two adjacent light sources may be increased sometimes to reduce the number of modules to be used.

Figure 1:
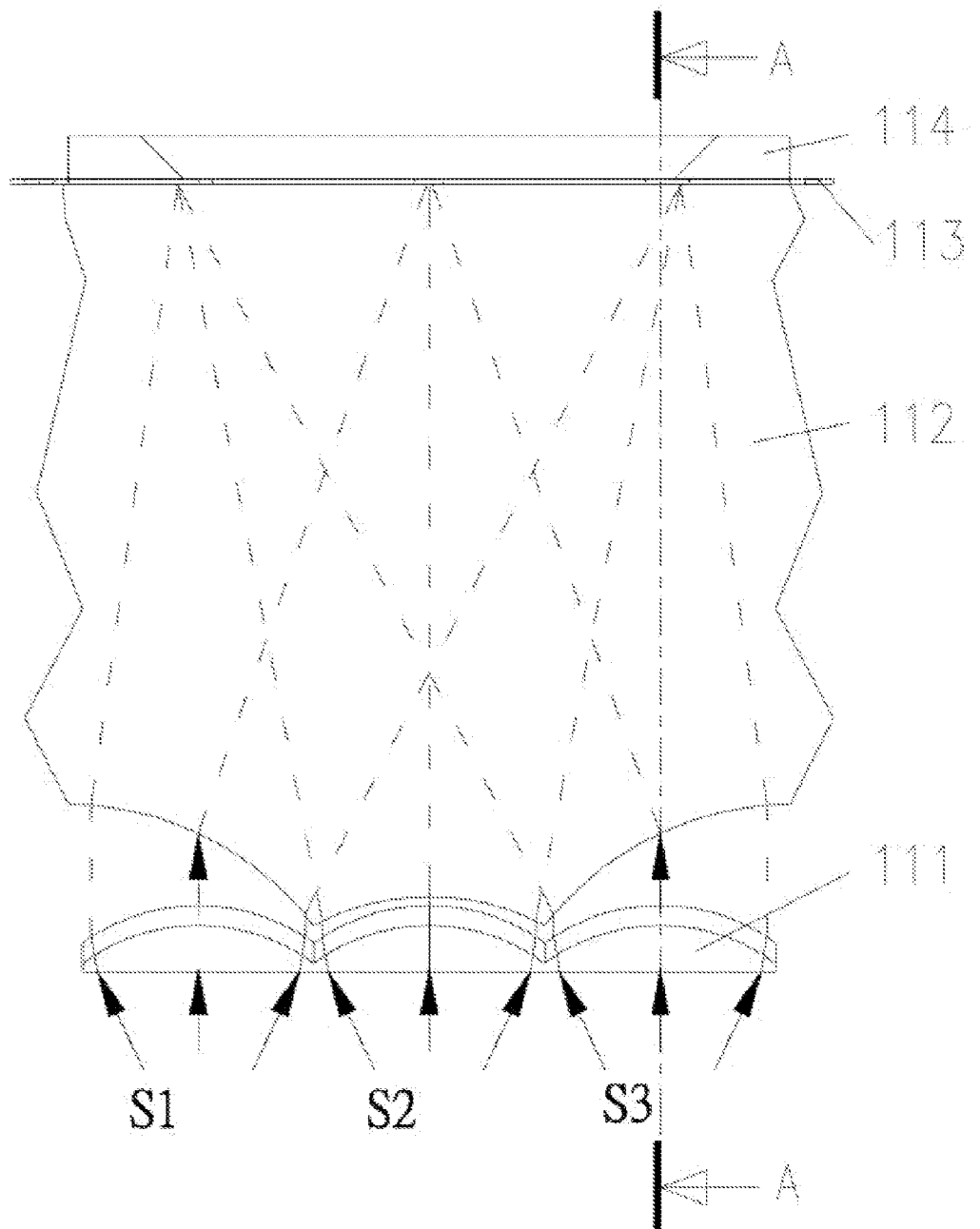
FIG. 1 is a schematic structural view of a preferred embodiment of the present invention.
Figure 2:
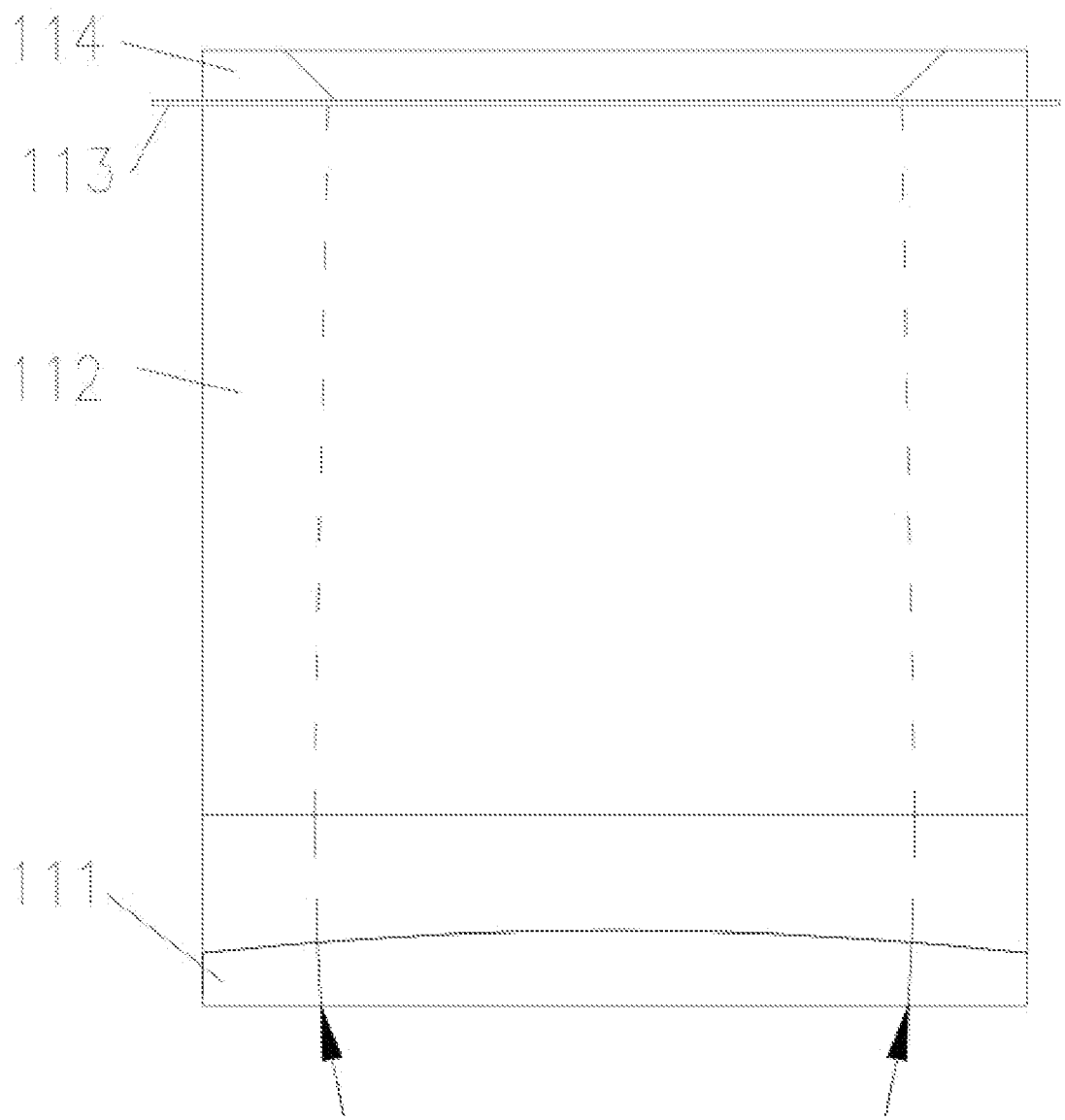
FIG. 2 is a cross-sectional view along A-A of FIG. 1, according to the preferred embodiment of the present invention.
Figure 3:
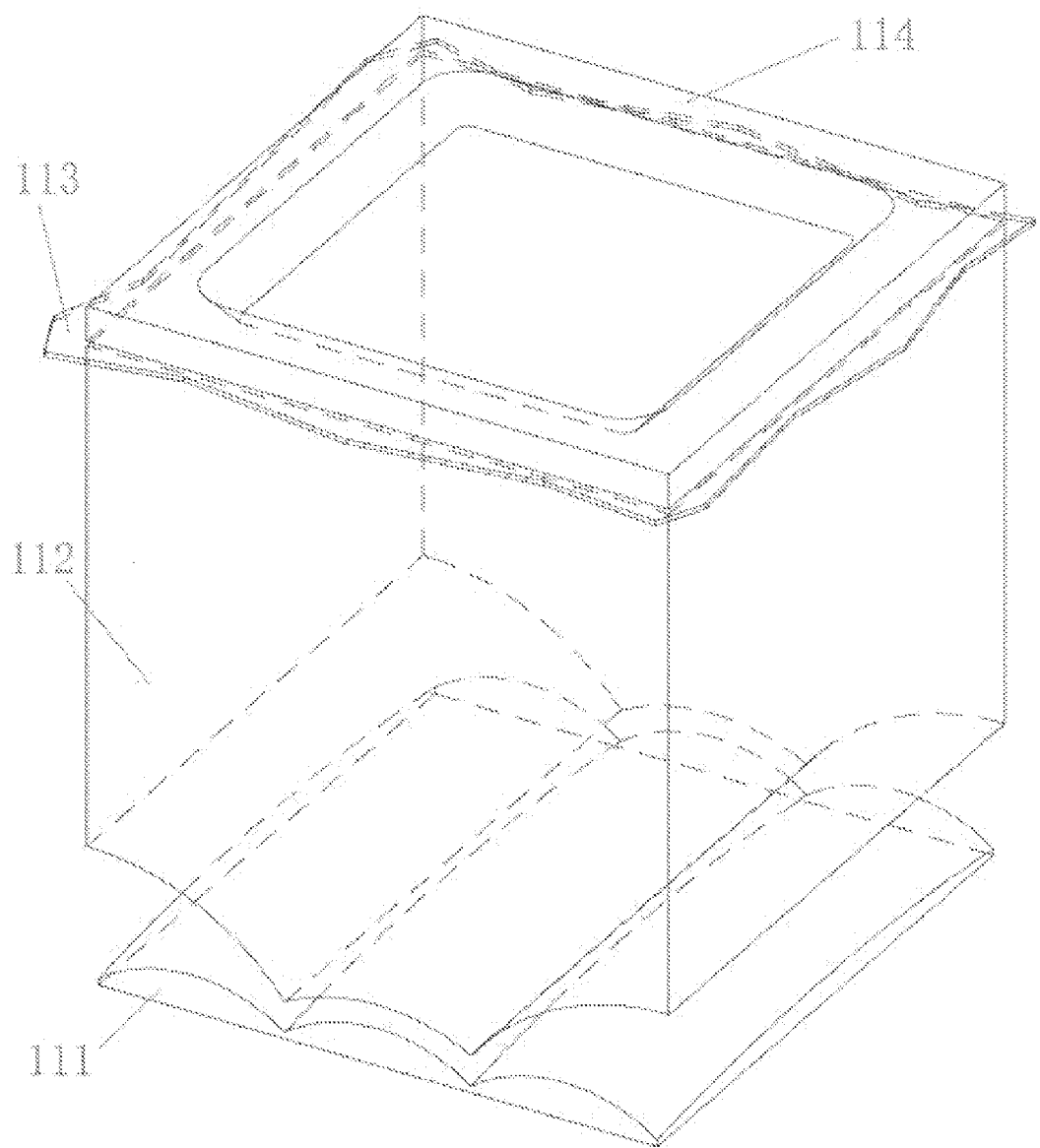
FIG. 3 is a perspective view showing the structure of the preferred embodiment of the present invention.

A single pixel monochromatic display and signal-receivable module is shown in FIGS. 1-3. FIG. 1 is a schematic structural view of a preferred embodiment of the present invention. FIG. 2 is a cross-sectional view along A-A of FIG. 1. FIG. 3 is a perspective view showing the structure of the present invention. As shown in the figures, the single pixel monochromatic display and signal-receivable module comprises:

Color light sources, in other words, three primary color light sources adjacent to one another, wherein the three primary color light sources are red color light source S1, green color light source S2 and blue color light source S3 respectively;

Light refractive color convergent plate 112; the light refractive color convergent plate 112 has an outwardly facing side being a light casting surface, and an inwardly facing side being corresponding surfaces (light refraction surfaces) each facing and corresponding to a respective color light source of the color light sources; each of the light refraction surfaces corresponds to a refraction curved surface; each refraction curved surface refracts a bundle of light beams generated by a corresponding color light source of the color light sources to the light casting surface; different bundles of light beams refracted by different refraction curved surfaces in the single pixel monochromatic display and signal-receivable module are however refracted to the same locations at the light casting surface; the light refractive color convergent plate 112 is made by transparent or semi-transparent material;

Color mixing screen 113; the color mixing screen 113 is tightly attached to the light casting surface of the light refractive color convergent plate 112, so that light beams in three different colors generated by the three color light sources are projected as a monochromatic color; the color mixing screen 113 can be formed by processing the light casting surface of the light refractive color convergent plate 112; the color mixing screen 113 is treated as a frosted surface, a matte surface, a frosted coating layer, a matte coating layer or a fluorescent material coating layer;

The single pixel monochromatic display and signal-receivable module may also comprise a light convergent plate 111 for converging each bundle of light beams generated by each of the color light sources through the light convergent plate so that light beams of each bundle of light beams possess properties of vector; the light convergent plate 111 is a set of concave lenses each corresponding to a respective color light source of the color light sources; each of the concave lenses gathers each bundle of diffused light beams of a respective color light source so that the diffused light beams of each bundle are gathered and projected to the light refractive color convergent plate 112. As said before, the light convergent plate is used for converging each bundle of light beams generated by each of the color light sources; if the color light sources have light convergence function, the light converging plate 111 can be omitted.

In order to reduce the influence of lights from surrounding environment so that a clear pixel can be formed and dark-light contrast can be increased, the color mixing screen 113 is also provided with a light blocking wall 114 at its outer side; the light blocking wall 114 is a frame or a coating layer made of dark or black light absorption material. We are able to see a color of an object since the object reflects light beams of that color, therefore we are able to see the light beams of that color; if an object does not reflect light of any color, we will not be able to see any color, and this object is said to be black in color. Black color does not reflect any light because black color absorbs all the lights. Of course, other frames or coating layers made by dark and light absorption materials achieving the same effect can serve as alternatives with equivalent effect.

Light beams generated by the three color light sources possess properties of vector after passing through the light convergent plate 111; the light beams are then projected to the light refractive color convergent plate 112 and then enter the light refraction surfaces of the light refractive color convergent plate 112; the light beams are then refracted to the color mixing screen 113 at another side of the light refractive color convergent plate 112 and there light beams of three different colors will be mixed into a single color.

The single pixel monochromatic display and signal-receivable module can transform an originally small area of lights into a large patch of color surface easily visible.

The single pixel monochromatic display and signal-receivable module can be applied to many different display devices. Moreover, more than one single pixel monochromatic display and signal-receivable module can be used by one display device. When a display device that may contain more than one single pixel monochromatic display and signal-receivable module contains more than one single pixel monochromatic display and signal-receivable module, the number of single pixel monochromatic display and signal-receivable module to be used is determined by the resolution of the display device, namely, one single pixel monochromatic display and signal-receivable module is used for each pixel. Specifically, if a display device has a resolution of, for example, 1024×768, which is equivalent to 1024×768=786,432 pixels, 786,432 single pixel monochromatic display and signal-receivable modules are to be used.

Preferably, if multiple single pixel monochromatic display and signal-receivable modules are used at the same time, an anti-interference separation layer 115 is also provided to separate lights diffused from each module to prevent mutual interference of lights diffused from different modules. The anti-interference separation layer 115 can be a light blocking barrier additionally mounted according to whatever manner or a barrier treated to possess light blocking property at the light refractive color convergent plate and/or the light refractive plate of each module.

The display device can be applied to a common display screen, a touch display screen, an interacting display screen or various display devices on camera equipment, photography equipment and meter apparatus etc.

The display device containing the single pixel monochromatic display and signal-receivable module of the present invention can also be equipped with an electronic grayscale control device to coordinate with the light blocking wall or be applied in lieu of the light blocking wall to achieve increased contrast. The electronic grayscale control device controls grayscale of the display device containing the single pixel monochromatic display and signal-receivable module of the present invention according to light magnitude of the pixel dots displayed. When lights of the pixel dots turn to be the brightest, the relevant pixel dots are controlled to possess a weaker grayscale by the electronic grayscale control device and turn transparent; when lights of the pixel dots turn to be black, the relevant pixel dots are controlled to possess stronger grayscale by the electronic grayscale control device and turn black.

When multiple numbers of single pixel monochromatic display and signal-receivable modules are used but the light blocking wall is not provided and some modules are not emitting lights, plenty of lights from the surrounding environment will brighten the color mixing screen 113 and also the light refractive color convergent plate 112 in such a way the modules not emitting lights are no longer gray or black. Comparatively, another light emitting module will display color with decreased contrast even it is emitting the brightest light because lights from the surrounding environment have partially brighten the color mixing screen 113 which should be entirely blocked from light. Also, the color on the color mixing screen 113 becomes weaker. The electronic grayscale control device can optimize the effect of display by electronically controlling the light blocking wall 114.

Figure 4:
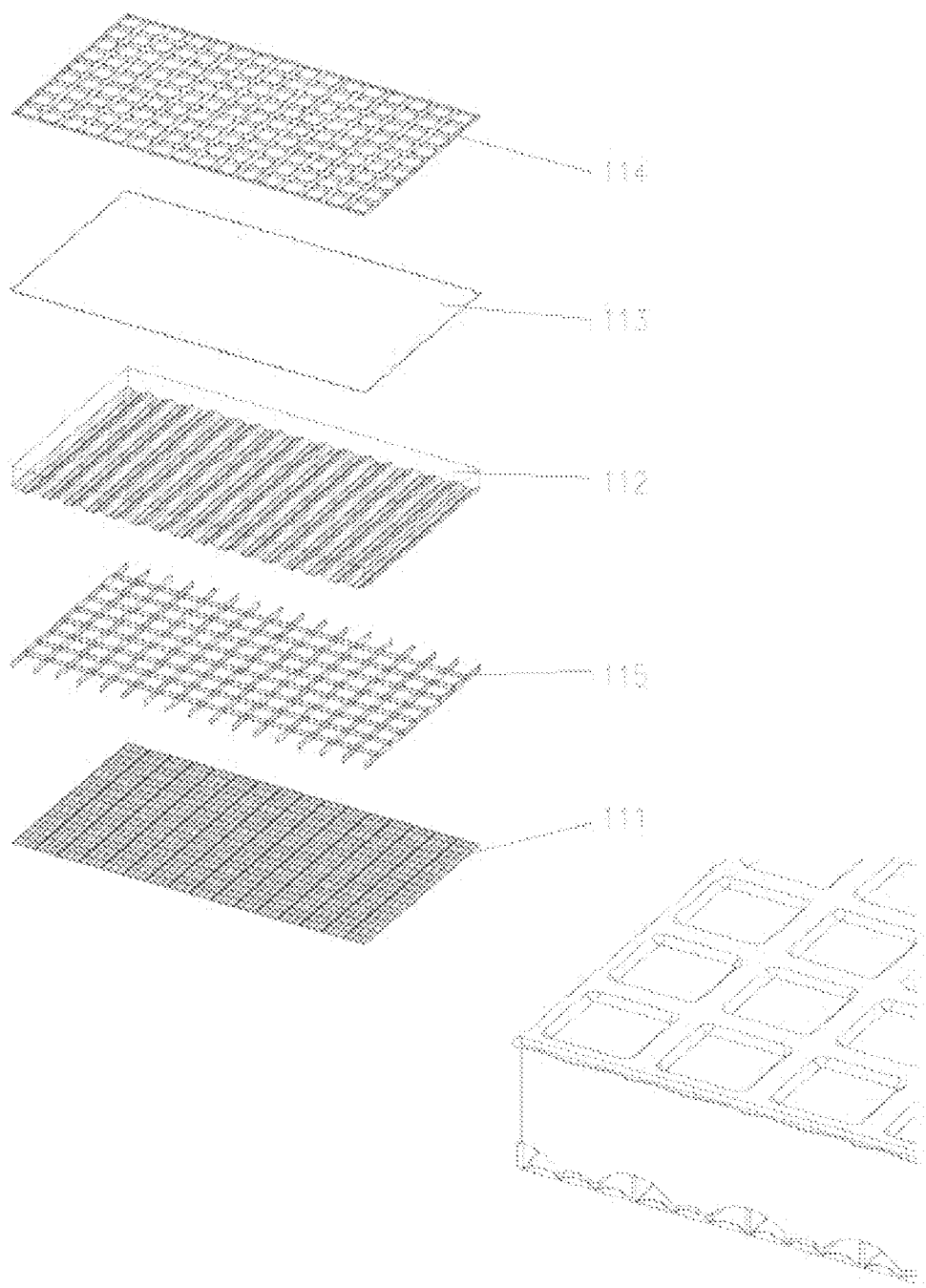
FIG. 4 shows the relative positions of different components according to the preferred embodiment of the present invention.

FIG. 4 shows the relative positions of different components of the present invention. The light blocking wall 114, the color mixing screen 113, the light refractive color convergent plate 112, the anti-interference separation layer 115 and the light convergent plate 111 are disposed sequentially from the left to the right or from the top to the bottom, and their structures are mutually adaptable as well.

Figure 5:
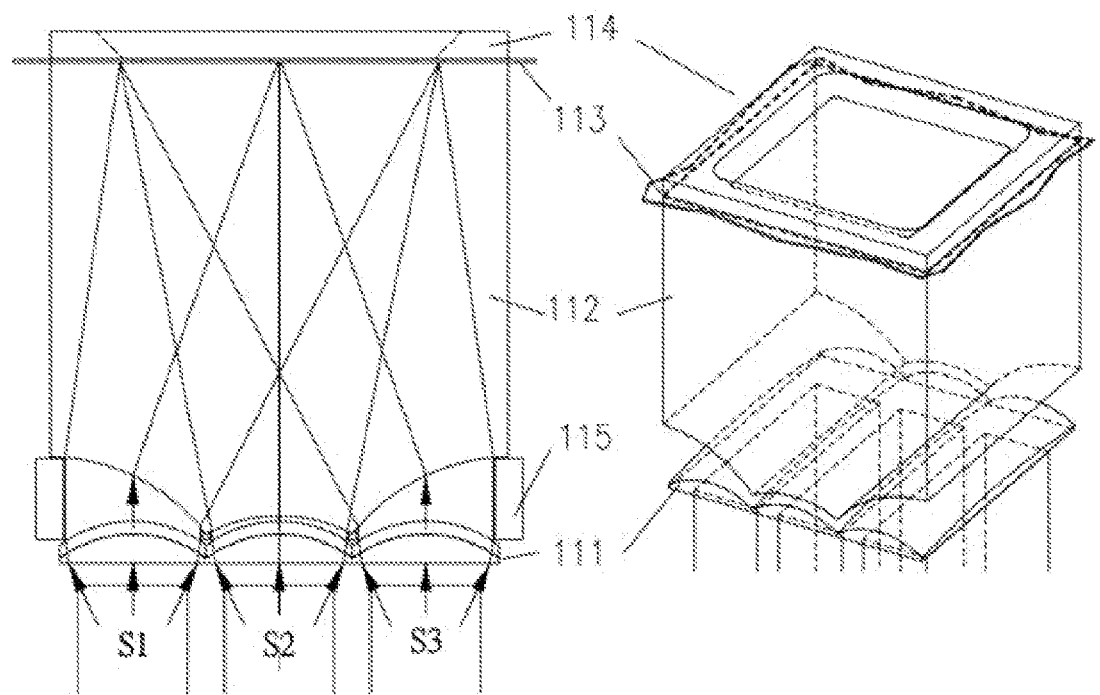
FIG. 5 is a schematic view showing application of rectangular shaped color light sources according to the preferred embodiment of the present invention.
Figure 5:
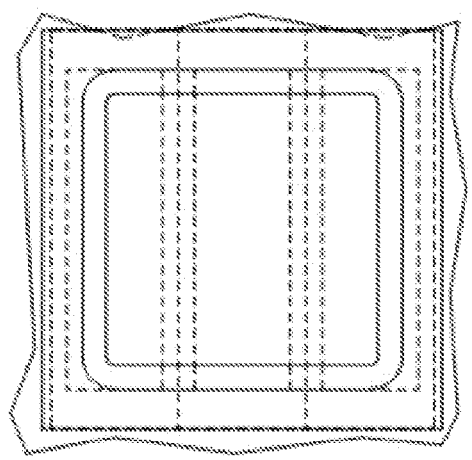
Figure 6:
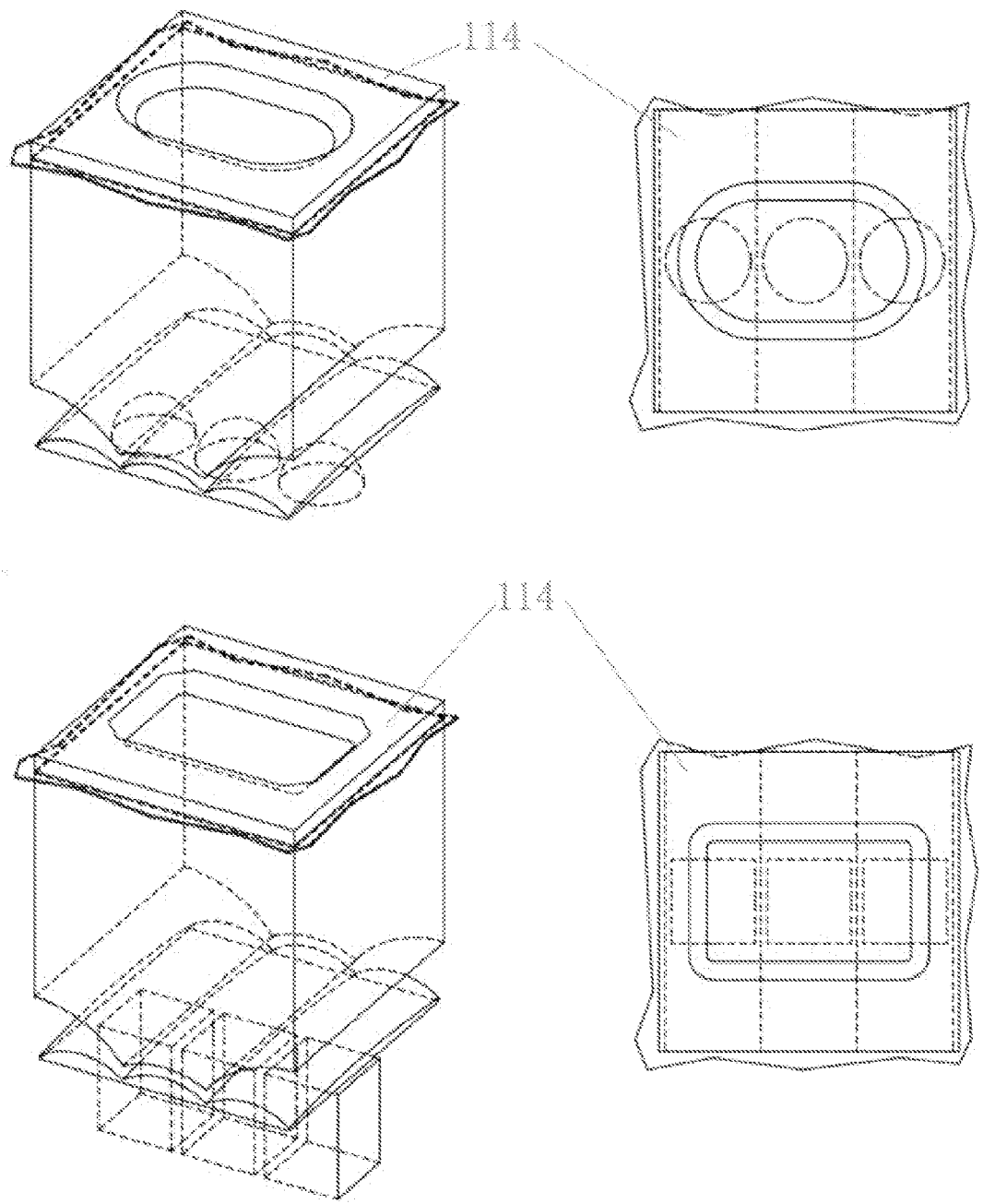
FIG. 6 is a schematic view showing applications of color light sources of other common shapes according to modified embodiments of the present invention.

FIGS. 5-6 are schematic structural views of the present invention when the color light sources are in rectangular shape or in commonly used circular shape or square shape. Of course, the color light sources are not limited to the shapes mentioned herein; the color light sources can adopt any other different shapes. Under the effects of the light refractive color convergent plate 112, the color mixing screen 113 and the light blocking wall 114, the original shape of the color light sources will not be apparent in actual use. The shape, for example rectangular shape, of the color light sources can be selected in accordance with practicability or aesthetic appearance.

The present invention is mainly a combination of a set of lenses and the light casting surface. Light beams projected from the color light sources experience convergence through the light convergent plate 111, and then the light beams mutually adjacent to one another after convergence are refracted through the light refractive color convergent plate 112 which has refraction curved surfaces, and then projected to the color mixing screen 113 on which a single color is formed and a single pixel is thereby constituted. Even subject to enlargement, there are no more tri-colors in a single pixel but only one single color in a single pixel. Under this fine technology, the display device is able to show image which is closer to the reality. Combination of original colors is no longer visible.

One or more components shown and described in the figures can be implemented in a more integrated or more independent manner. As an illustrative example, more than one of the single pixel monochromatic display and signal-receivable module can be applied to different kinds of display devices such as a common display screen, an LED (light emitting diodes) display screen, an LCD (liquid crystal display), a touch display screen, an interacting display screen, CRT (cathode ray tube) and a projector device, subject to usability in different specific embodiments.

Therefore, when the present invention as described herein is associated with a specific embodiment, the disclosure herein may require modification, change and replacement. Also, in some illustrative examples, some features of the embodiments of the present invention are applied, and other features not deviating from the scope and spirit of the present invention are not applied correspondingly. As such, modification can be made more than one time so that a specific condition or a specific material to be used falls within the scope and essential spirit of the present invention. The present invention should not be limited to the specific technical terms used herein or specific embodiments disclosed herein as the best mode of implementation of the present invention. The present invention should include all embodiments and equivalent replacement falling within the scope of the present invention.

For example, subject to practicability and aesthetic appearance, the color light sources can be in rectangular shape, circular shape, square shape or other attainable shapes. The light convergent plate 111, the light refractive color convergent plate 112 and the color mixing screen 113 can be made by one or more layers of transparent or semi-transparent material. The light blocking wall 114 can selectively be a frame or a coating layer made of dark or black light absorption material. Of course, other frames or coating layers made of light absorption material are also acceptable. As a special design, the light blocking wall 114 can be used for substituting or used for coordinating with the electronic grayscale control device.

The single pixel monochromatic display and signal-receivable module of the present invention can use any color light sources. Multiple numbers, for example two or four, of other color light sources may be used by modifying the light refractive color convergent plate to contain for example two or four refractive curved surfaces according to the color light sources to be used. In principle, the single pixel monochromatic display and signal-receivable module of the present invention is suitable for any electromagnetic waves that can be refracted, for example infrared and ultraviolet etc. Although these electromagnetic waves are not visible, application of these electromagnetic waves to the present invention can still be useful, for example, when electromagnetic waves not in successive zones of the electromagnetic spectrum, for example infrared and ultraviolet, are put together in the single pixel monochromatic display and signal-receivable module of the present invention and projected from the same position, they can constitute an emitter/signal emitter detectable and observable by other equipment or apparatus.

Also, due to reversibility of the electromagnetic waves, the present invention can serve special sensing purpose when the light sources are replaced by various kinds of sensors. For example, if the single pixel monochromatic display and signal-receivable module of the present invention are applied throughout the whole screen, each single pixel monochromatic display and signal-receivable module may be provided with one additional refractive curved surface, for example, three refractive curved surfaces for three color light sources and one additional refractive curved surface for detecting and receiving invisible electromagnetic waves so as to enable a receiving function of the screen. As such, the screen can have a feedback function, or it can receive certain signals while displaying and emitting signals. Of course, the whole screen may also be used for receiving different invisible electromagnetic waves in use in the electromagnetic spectrum. Also, only one single pixel monochromatic display and signal-receivable module instead of the whole screen may be modified.

The embodiments of the present invention described above and the contents described in the abstract are not intended to exhaust the specific implementations of the present invention or limit the present invention to the specific implementations described herein. The specific embodiments and illustrative examples of the present disclosure are used only for explanation. A person skilled in this field of art should know and understand that various modifications enabling equivalent effect can be made within the scope and spirit of the present invention. All modifications can be made in this manner based on the above description of the embodiments of the present invention, and all these modifications should fall within the scope and spirit of the present invention.

What is claimed is:

1. A single pixel monochromatic display and signal-receivable module, characterized in that, in each pixel, it comprises:
    color light sources, wherein the color light sources are multiple in number and are arranged adjacent to one another; different color light sources generate light beams of different colors;
    a light convergent plate; the light convergent plate is a set of concave lenses each corresponding to a respective color light source of the color light sources; each of the concave lenses gathers a bundle of diffused light beams generated by a respective color light source so that the bundle of diffused light beams generated by the respective color light source are gathered and projected to a light refractive color convergent plate; the light convergent plate is used for converging each bundle of diffused light beams generated by each of the color light sources;
    the light refractive color convergent plate has refraction curved surfaces; each refraction curved surface refracts a respective bundle of diffused fight beams converged by the light convergent plate to a light casting surface which is on another side of the light refractive color convergent plate; different bundles of diffused light beams converged by the light convergent plate and then refracted by different refraction curved surfaces In the single pixel monochromatic display and signal-receivable module are however refracted to the same locations at the light casting surface;
    a color mixing screen; the color mixing screen is a screen that projects the light beams of different colors generated by different color light sources as a monochromatic color,
    a light blocking wall; the light blocking wall is provided so that the color mixing screen experiences reduced influence of lights from surrounding environment, thereby allowing a clear pixel to be formed and allowing better dark-light contrast and increasing degree of contrast;
    the light beams of different colors generated by different color light sources are projected to the light refractive color convergent plate after convergence, and then enter the light refraction surfaces of the light refractive color convergent plate, and then refracted to the light casting surface of the light refractive color convergent plate; on the color mixing screen which is tightly attached to the light casting surface, the light beams of different colors are mixed into a monochromatic color.

2. The single pixel monochromatic display and signal-receivable module as in claim 1, wherein the light convergent plate is a set of concave lenses each corresponding to a respective color light source of the color light sources.

3. The single pixel monochromatic display and signal-receivable module as in claim 1, wherein more than one of the single pixel monochromatic display and signal-receivable module are combined and used in form of linear arrangement, a surface plane or other kinds of arrangement.

4. The single pixel monochromatic display and signal-receivable module as in claim 1, wherein the light refractive color convergent plate is made of transparent or semi-transparent material.

5. The single pixel monochromatic display and signal-receivable module as in claim 1, wherein the color mixing screen is provided independently and separately, or formed by processing the light casting surface of the light refractive color convergent plate.

6. The single pixel monochromatic display and signal-receivable module as in claim 1, wherein the color mixing screen is treated as a frosted surface, a matte surface, a frosted coating layer, a matte coating layer or a fluorescent material coating layer.

7. The single pixel monochromatic display and signal-receivable module as in claim 1, wherein the light blocking wall is a frame or a coating layer made of dark or black light absorption material.

8. A display device containing the single pixel monochromatic display and signal-receivable module of claim 1, characterized in that, the display device comprises multiple single pixel monochromatic display and signal-receivable modules, and further comprises an anti-inference separation layer for separating the single pixei monochromatic display and signal-receivable modules to prevent their mutual interference.

9. The display device as in claim 8, wherein the anti-interference separation layer is a light blocking barrier additionally mounted or a barrier treated to possess light blocking property at a light refractive color convergent plate and/or a light refractive plate of each of the single pixel monochromatic display and signal-receivable modules.

10. The display device as in claim as 8, wherein an electronic grayscale control device is provided for controlling so as to increase contrast during display; the electronic grayscale control device coordinates with a light blocking wall or is used in lieu of the light blocking waiI; the electronic grayscale control device controls grayscale of the display device containing single pixel monochromatic display and signal-receivable module according to light magnitude of pixel dots displayed.

* * * * *